(12) United States Patent
Zhao et al.

(10) Patent No.: US 10,913,210 B2
(45) Date of Patent: Feb. 9, 2021

(54) MOLD-LESS CURING METHOD OF MANUFACTURING A COMPOSITE VESSEL ASSEMBLY

(71) Applicant: UNITED TECHNOLOGIES CORPORATION, Farmington, CT (US)

(72) Inventors: Wenping Zhao, Glastonbury, CT (US); Ellen Y. Sun, South Windsor, CT (US)

(73) Assignee: RAYTHEON TECHNOLOGIES CORPORATION, Waltham, MA (US)

(*) Notice: Subject to any disclaimer, the term of this patent is extended or adjusted under 35 U.S.C. 154(b) by 324 days.

(21) Appl. No.: 15/440,448

(22) Filed: Feb. 23, 2017

(65) Prior Publication Data

US 2018/0236718 A1 Aug. 23, 2018

(51) Int. Cl.
*B29C 65/02* (2006.01)
*B29C 63/00* (2006.01)
*B29C 65/00* (2006.01)
*B65B 3/02* (2006.01)
*B65B 31/00* (2006.01)
(Continued)

(52) U.S. Cl.
CPC .......... *B29C 65/02* (2013.01); *B29C 63/0073* (2013.01); *B29C 63/0091* (2013.01); *B29C 66/006* (2013.01); *B29C 70/446* (2013.01); *B33Y 70/00* (2014.12); *B65B 3/02* (2013.01); *B65B 31/00* (2013.01); *F17C 1/04* (2013.01); *F17C 1/16* (2013.01); *B29L 2031/712* (2013.01); *F17C 2201/0152* (2013.01); *F17C 2201/054* (2013.01); *F17C 2201/056* (2013.01); *F17C 2203/0604* (2013.01); *F17C 2203/066* (2013.01); *F17C 2203/0619* (2013.01); *F17C 2203/0636* (2013.01); *F17C 2203/0663* (2013.01); *F17C 2209/2109* (2013.01); *F17C 2209/2118* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/0153* (2013.01); *F17C 2223/033* (2013.01);
(Continued)

(58) Field of Classification Search
CPC ...................................................... B29C 65/02
See application file for complete search history.

(56) References Cited

U.S. PATENT DOCUMENTS 6,485,668 B1 11/2002 Murphy et al.
8,821,667 B2 9/2014 Sneddon

FOREIGN PATENT DOCUMENTS

EP 1695805 A1 8/2006
GB 2421926 A 7/2006
(Continued)

OTHER PUBLICATIONS

International Search Report from the International Searching Authority for International Application No. PCT/US2017/068423; Date of Completion: Apr. 6, 2018; dated Apr. 17, 2018; 7 Pages.
(Continued)

*Primary Examiner* — Larry W Thrower
(74) *Attorney, Agent, or Firm* — Cantor Colburn LLP

(57) ABSTRACT

A method of manufacturing a composite vessel assembly includes the step of placing the composite vessel assembly in a pliable containment prior to curing of a resin of the composite vessel assembly. With the composite vessel assembly in the pliable containment, a vacuum is applied through an orifice in the pliable containment to evacuate air and compact the composite vessel assembly.

16 Claims, 12 Drawing Sheets

(51) Int. Cl.
*B29C 70/44* (2006.01)
*B33Y 70/00* (2020.01)
*F17C 1/16* (2006.01)
*F17C 1/04* (2006.01)
*B29L 31/00* (2006.01)

(52) U.S. Cl.
CPC .. *F17C 2223/035* (2013.01); *F17C 2223/036* (2013.01); *F17C 2270/01* (2013.01)

(56) References Cited

FOREIGN PATENT DOCUMENTS

| | | | |
|---|---|---|---|
| WO | 2015188925 | A1 | 12/2015 |
| WO | 2016057024 | A1 | 4/2016 |
| WO | 2016151495 | A1 | 9/2016 |

OTHER PUBLICATIONS

Written Opinion from the International Searching Authority for International Application No. PCT/US2017/068423; International Filing Date: Dec. 26, 2017; dated Apr. 17, 2018; 5 Pages.

MOLD-LESS CURING METHOD OF MANUFACTURING A COMPOSITE VESSEL ASSEMBLY

STATEMENT REGARDING FEDERALLY SPONSORED RESEARCH OR DEVELOPMENT

This invention was made with Government support under Agreement DE-AR0000254 for ARPA-E Low Cost Hybrid Materials and Manufacturing for Conformable CNG Tank. The Government has certain rights in the invention.

BACKGROUND

The present disclosure relates to a vessel assembly and more particularly to a mold-less curing method of manufacturing the vessel assembly.

Pressure vessels may serve as storage media (e.g., gas) for a wide variety of consumer, commercial, and industrial processes. In order to store sufficient mass of gas for any operation within a given volume, the gas is stored at high pressure. Traditionally, pressure vessels have a typical spherical or cylindrical design that evenly distributes stress in the containment perimeter. Unfortunately, such tanks do not use allocated space efficiently. For example, a spherical vessel fills a cubic space with about fifty-two percent efficiency, and a cylindrical vessel fills a rectangular volume with approximately seventy percent efficiency. More recent improvements in pressure vessels that generally conform to a rectangular volume may fill the space with about ninety percent efficiency relative to a true rectangular volume.

The designs of non-spherical/cylindrical pressure vessels to support high internal pressure are complex, including variable-curvature external surfaces and internal structure to transfer mechanical loads. The large size of a high conformable vessel and the complicated shapes may lead to manufacturing challenges. In addition, manufacturing needs to consistently provide reliable, high-volume, lightweight and low-cost constructions with high strength mechanical properties.

SUMMARY

A method of manufacturing a composite vessel assembly according to one, non-limiting, embodiment of the present disclosure includes placing the composite vessel assembly in a pliable containment prior to curing of a resin of the composite vessel assembly; and applying a vacuum to the inside of the pliable containment and through a first orifice in the pliable containment to evacuate air and compact the composite vessel assembly.

Additionally to the foregoing embodiment, the pliable containment is in biased contact with the composite vessel assembly when the vacuum is applied.

In the alternative or additionally thereto, in the foregoing embodiment, the method includes sealing a portion of the pliable containment that defines a second orifice about a nozzle of the composite vessel assembly; and placing a chamber of the composite vessel assembly under a pressure equal to or greater than atmospheric pressure when the pliable containment is under the vacuum.

In the alternative or additionally thereto, in the foregoing embodiment, a liner of the composite vessel assembly defines the chamber and a composite layer of the composite vessel assembly at least in-part surrounds the liner.

In the alternative or additionally thereto, in the foregoing embodiment, the method includes curing the resin of the composite vessel assembly when under the vacuum.

In the alternative or additionally thereto, in the foregoing embodiment, the method includes wrapping the composite vessel assembly with at least one sheet before placing the composite vessel assembly in the pliable containment; releasing the vacuum after the resin has cured; removing the composite vessel assembly and the at least one sheet from the pliable containment; and removing the at least one sheet from the composite vessel assembly.

In the alternative or additionally thereto, in the foregoing embodiment, the method includes drawing the uncured resin when in a fluid state into the pliable containment and through a third orifice in the pliable containment when under the vacuum; and infusing the composite vessel assembly with the uncured resin.

In the alternative or additionally thereto, in the foregoing embodiment, the pliable containment is a bag.

In the alternative or additionally thereto, in the foregoing embodiment, the method includes wrapping the composite vessel assembly with at least one sheet before placing the composite vessel assembly in the pliable containment; releasing the vacuum; removing the composite vessel assembly and the at least one sheet from the pliable containment; and removing the at least one sheet from the composite vessel assembly.

In the alternative or additionally thereto, in the foregoing embodiment, the at least one sheet includes a porous release film.

In the alternative or additionally thereto, in the foregoing embodiment, the method includes filling a chamber defined by a liner of the composite vessel assembly with a granulate.

In the alternative or additionally thereto, in the foregoing embodiment, the method includes plugging a nozzle of the composite vessel assembly after filling the chamber with the granulate and before applying the vacuum.

In the alternative or additionally thereto, in the foregoing embodiment, the liner is at least in part surrounded by a composite layer exposed to the vacuum and in contact with the pliable containment when under the vacuum.

In the alternative or additionally thereto, in the foregoing embodiment, the composite vessel assembly includes an outer composite layer, a plurality of vessels, and a plurality of junctions generally disposed between each adjacent vessel of the plurality of vessels, and wherein the outer composite layer surrounds the plurality of vessels and the plurality of junctions.

In the alternative or additionally thereto, in the foregoing embodiment, the outer composite layer and the plurality of junctions are resin-based and uncured when the vacuum is applied.

In the alternative or additionally thereto, in the foregoing embodiment, the method includes releasing the vacuum prior to curing of the resin; removing the composite vessel assembly from the pliable containment; and placing the composite vessel assembly in a mold for curing of the resin.

A pliable containment for manufacturing a composite vessel assembly having a nozzle for fluid communication with a chamber of the composite vessel assembly according to another, non-limiting, embodiment includes a first portion defining a first orifice constructed and arranged to draw a vacuum from inside the pliable containment; and a second portion defining a second orifice and constructed and arranged to seal about the nozzle to expose the chamber to a pressure equal to or greater than atmospheric pressure as the vacuum is drawn through the first orifice.

Additionally to the foregoing embodiment, the pliable containment includes a third portion defining a third orifice for flowing a liquid resin into the pliable containment as the vacuum is being drawn.

In the alternative or additionally thereto, in the foregoing embodiment, the pliable containment is a bag made of a plastic film.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

The detailed description explains embodiments of the invention, together with advantages and features, by way of example with reference to the drawings.

DETAILED DESCRIPTION OF THE INVENTION

Figure 1:
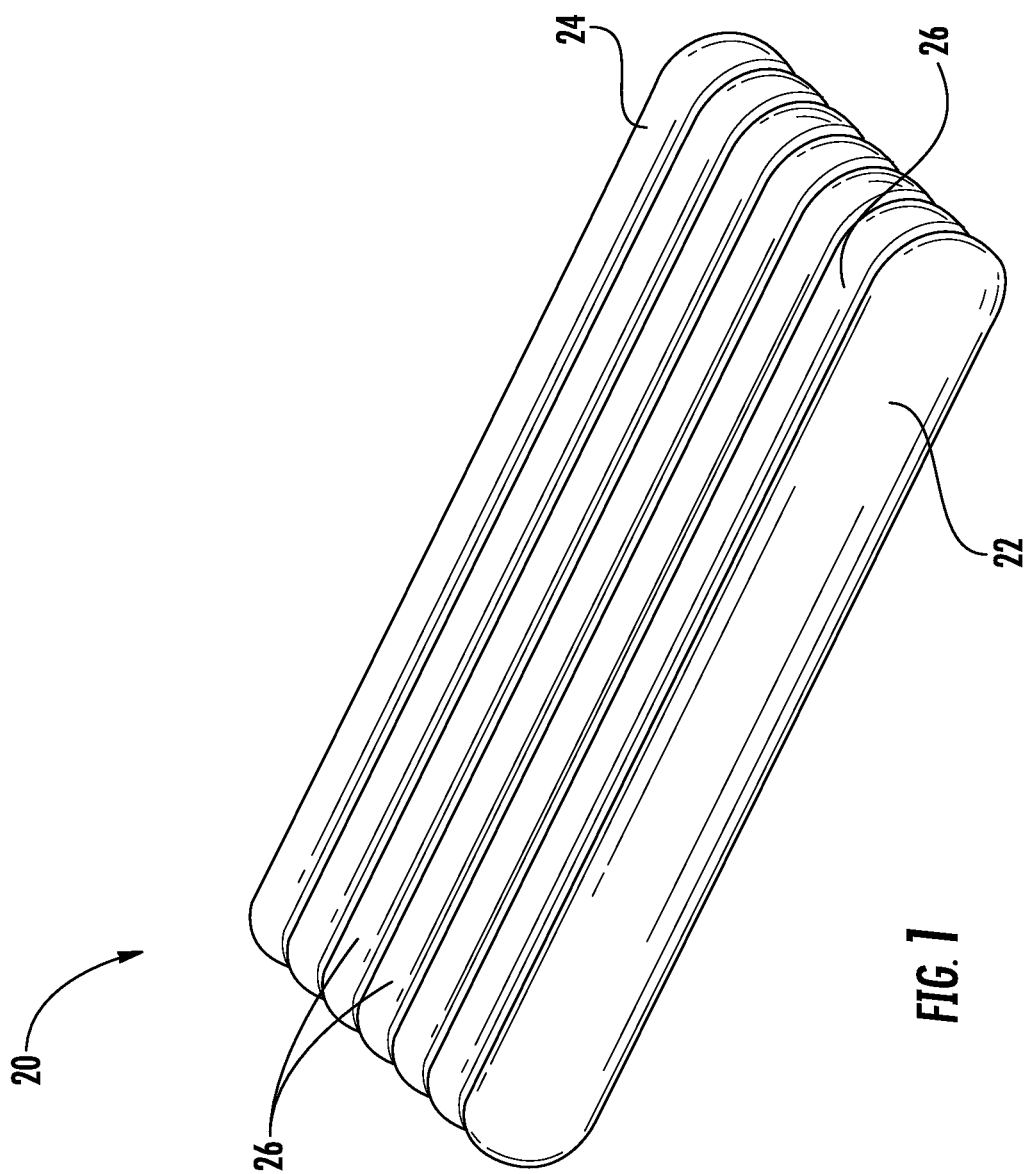
FIG. 1 is a perspective view of a vessel assembly configured to store a pressurized fluid according to an exemplary embodiment of the invention.

Referring now to FIG. 1, an example of a vessel or tank assembly 20 may be configured to store a high pressure fluid as illustrated. Exemplary fluids that may be stored within the pressure vessel assembly 20 include, but are not limited to, compressed natural gas (CNG), hydrogen, propane, methane, air, and hydraulic fluid, for example. The vessel assembly 20 may generally include two flanking vessels 22, 24 and at least one interior vessel 26 (e.g., five identical interior vessels illustrated) joined to and disposed between the flanking vessels 22, 24. Each vessel 22, 24, 26 may generally be elongated with the overall configuration of the vessel assembly 20 generally being a rectangular shape, but as will be appreciated from the description, herein, other shapes are contemplated. It is further contemplated and understood that some applications of the present disclosure may include vessel assemblies 20 that are not under significant pressure, and that may not include any interior vessel and/or liner.

Figure 2:
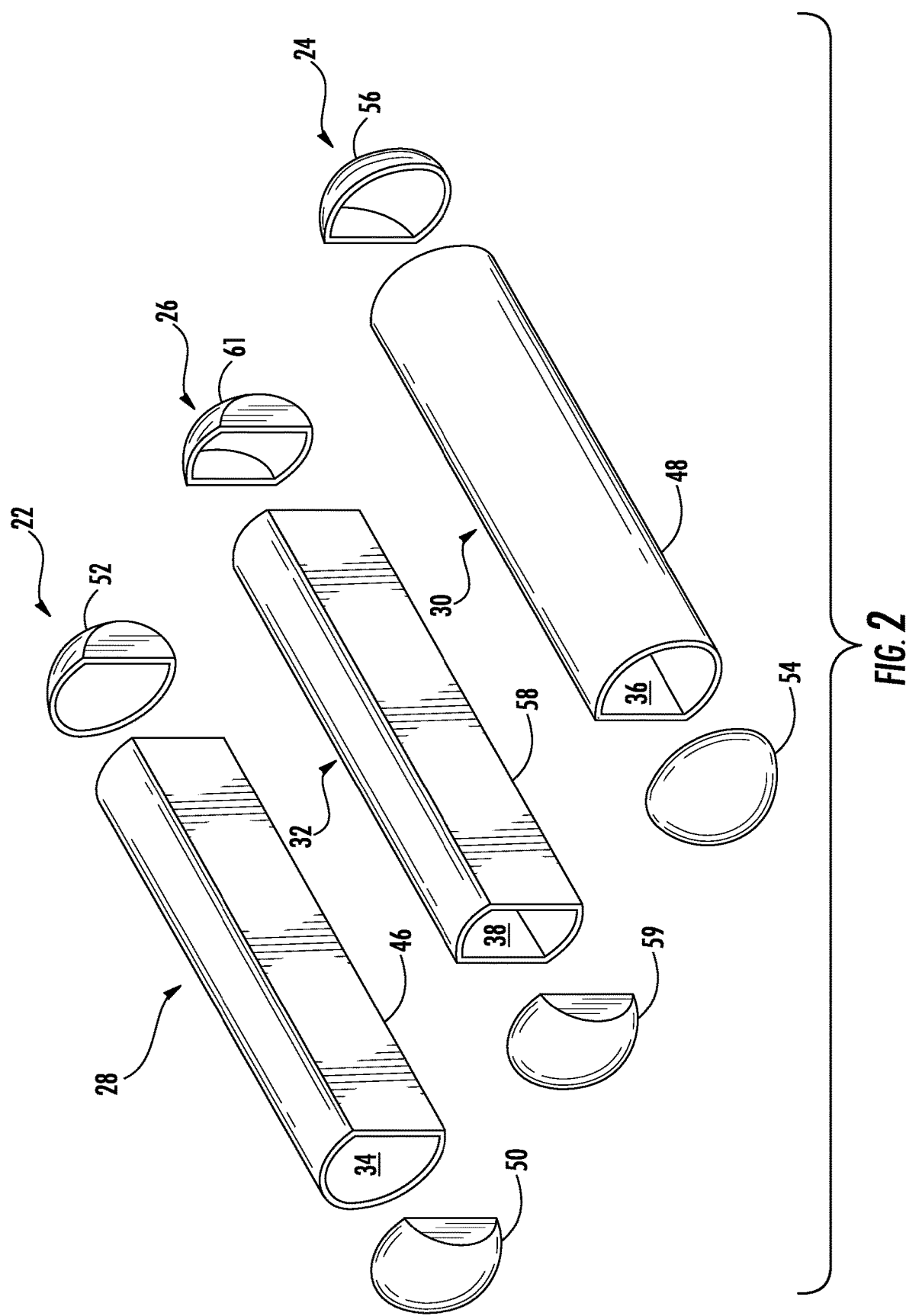
FIG. 2 is an exploded perspective view of liners of the vessel assembly.
Figure 3:
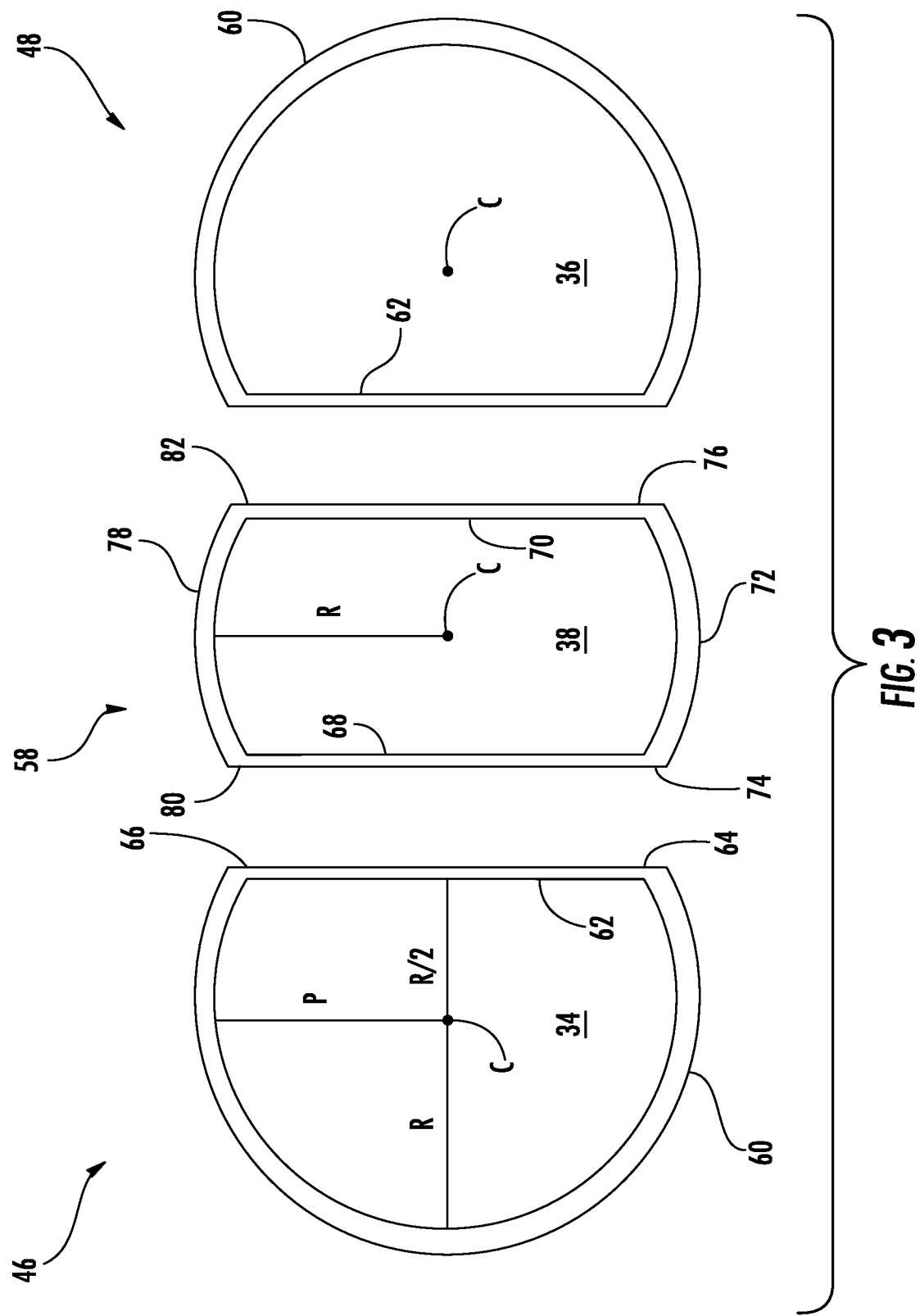
FIG. 3 is a cross section of the liners.

Referring to FIGS. 2 and 3, each vessel 22, 24, 26 may include respective liners 28, 30, 32. Each liner 28, 30, 32 may define the boundaries of respective chambers 34, 36, 38 for fluid storage. Although not shown, the chambers 34, 36, 38 may be in fluid communication with adjacent chamber(s). The flanking liners 28, 30 may include respective, open-ended, lobes 46, 48 with lobe 46 ends closed-off by opposite end caps 50, 52, and lobe 48 ends closed-off by opposite end caps 54, 56. Each lobe 46, 48 may be circumferentially continuous and substantially cylindrical. The interior liner 32 may include an open-ended lobe 58 with the lobe 58 ends closed-off by opposite end caps 59, 61. Lobe 58 may be circumferentially continuous. It is further contemplated and understood that the liners 28, 30, 32 may take the form of any shape that defines the boundaries of an internal chamber capable of storing a fluid.

The liners 28, 30, 32 may be a contoured bladder having a minimal wall thickness. The liners 28, 30, 32 may be made of any material and wall thickness capable of preventing or minimizing stored gas or fluid permeation through the wall, minimizing weight, reducing costs, and meeting other parameters necessary for a particular application. Examples of liner material may include a metallic foil-like composition, plastic (e.g., thermoplastic, thermoset, and other polymer materials), elastomeric material, and other resilient liner materials. The liners 28, 30, 32 may be manufactured by any variety of techniques including blow molded plastic, injection molded plastic, and others. It is further contemplated and understood that the liners 28, 30, 32 may have the necessary structural integrity to maintain a pre-formed shape either standing on their own, or, during a manufacturing process that adds or envelopes the liners with an additional layer that may be a composite material for structural strength.

Referring to FIG. 3, the lobes 46, 48 of the respective flanking liners 28, 30 may be substantially identical and are arranged such that the lobe 46 of the first flanking liner 28 is rotated about one-hundred and eighty (180) degrees relative to the lobe 48 of the opposite flanking liner 30 (i.e., are arranged as a mirror image of one-another). Each flanking lobe 46, 48 may include a generally cylindrical outer portion or wall 60 and an interior portion or wall 62. The interior wall 62 may be substantially planar and may laterally span between a first end 64 and a second end 66 of the cylindrical outer wall 60. In one embodiment, the interior wall 62 is integrally formed with the ends 64, 66 of the cylindrical outer wall 60. At least a portion of the curvature of the cylindrical outer wall 60 is defined by a radius R. In one embodiment, the portion of the outer wall 60, opposite the interior wall 62, includes a circular shape or curve generally spanning about two-hundred and forty (240) degrees with the radius R and about a centerline C. Consequently, the overall height of the flanking lobes 46, 48 is equal to double the length of the radius R of the cylindrical outer wall 60. The interior wall 62 (i.e., disposed vertically per the landscape illustrative perspective of FIG. 3) is generally parallel to and spaced apart from a vertical plane P that includes the origin of the radius R that defines the curvature of the outer wall 60. In one embodiment, the distance between the interior wall 62 and the parallel vertical plane P is about half the length of the radius R if the Y-joint is about one-hundred and twenty (120) degrees. As a result, the flanking lobes 46, 48 generally have a width equal to about one and a half the length of the radius of curvature R of the outer wall 60.

The illustrated interior lobe 58 includes first and second interior sidewalls 68, 70 that may be diametrically opposite one another, substantially vertically arranged (i.e., per the landscape illustrative perspective of FIG. 3), and separated from one another by a distance. In one embodiment, the width of the interior lobe 58 is generally equal to the radius of curvature R of the end lobes 46, 48. The thicknesses of the first interior sidewall 68 and the second interior sidewall 70 may be identical and may be equal to the thickness of the interior wall 62 of the flanking lobes 46, 48. A first outside wall 72 extends between a first end 74 of the first interior sidewall 68 and a first end 76 of the second interior sidewall 70. Similarly, a second outside wall 78 extends between a second end 80 of the first interior sidewall 68 and a second end 82 of the second interior sidewall 70.

The curvature of the first outside wall 72 and the second outside wall 78 may be defined by a circular shape or curve generally of a sixty (60) degree angle by a radius R. In one embodiment, the radius of curvature R of the interior lobe 58 is substantially identical to the radius of curvature R of the flanking lobes 46, 48. Consequently, the distance between the first curved wall 72 and the second curved wall 78 is double the length of the radius of curvature R, and is therefore, substantially equal to the height of the flanking lobes 46, 48.

Figure 4:
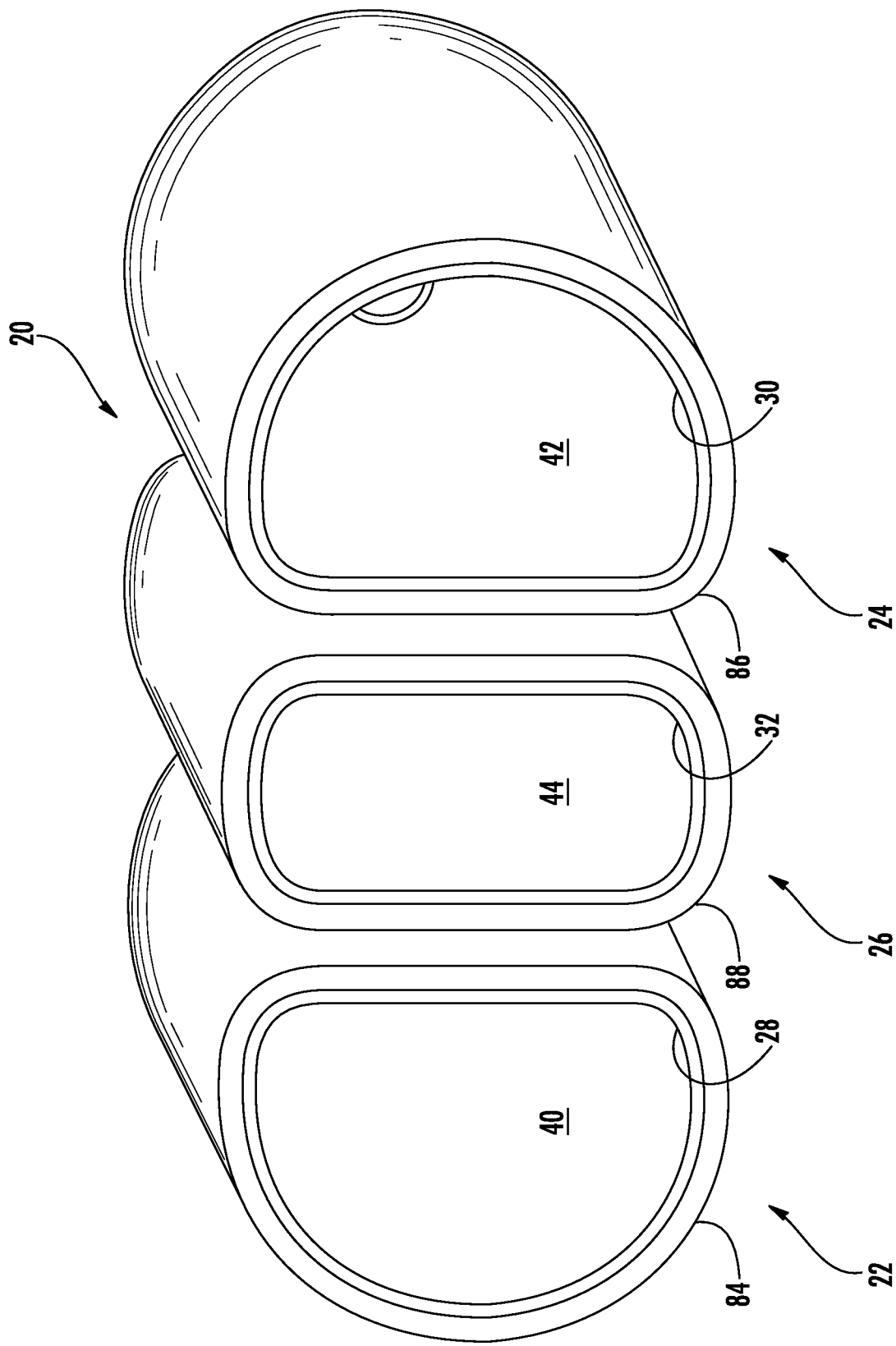
FIG. 4 is a perspective cross section of the liners with an inner-layer applied.

Referring to FIG. 4, the vessels 22, 24, 26 may include respective inner-layers 84, 86, 88 that substantially cover the respective liners 28, 30, 32. The inner-layers 84, 86, 88 may be a composite, and may be a continuous fiber wrapping or prepregs (i.e., fiber with resin) wrapped about the lobes and end caps of the liners for structural strength and for distributing internal stress. Alternatively, the inner-layers 84, 86, 88 may include a braiding that wraps about the respective liners 28, 30, 32, or may be a resin impregnated chopped fiber that may be spray applied. The primary reinforcement (i.e., the fibers or braiding), may be made of a carbon fiber, a glass fiber or an aramid fiber. A matrix material or resin for binding the continuous fibers may include epoxy, vinyl ester, urethane, and other resin polymers that may be nano-enhanced. It is further contemplated and understood that the inner-layers 84, 86, 88 may comprise other materials and/or processes including automated fiber placement, winded filaments, and/or a mixture of continuous and non-continuous fiber.

When the composite vessel assembly 20 is at least partially assembled, the interior wall 62 of the flanking lobe 46 is opposed and in proximity to the interior sidewall 68 of the interior lobe 58. The portion of the inner-layer 84 covering the interior wall 62 may be directly adjacent to the portion of the inner-layer 88 that covers the sidewall 68. Moreover, the portion of the inner-layer 84 covering the interior wall 62 may be adhered to the portion of the inner-layer 88 that covers the sidewall 68 if, for example, prepreg is applied. Similarly, the interior wall 62 of the flanking lobe 48 is opposed and in proximity to the interior sidewall 70 of the interior lobe 58. The portion of the inner-layer 86 covering the interior wall 62 may be directly adjacent and adhered to the portion of the inner-layer 88 that covers the sidewall 70.

Figure 5:
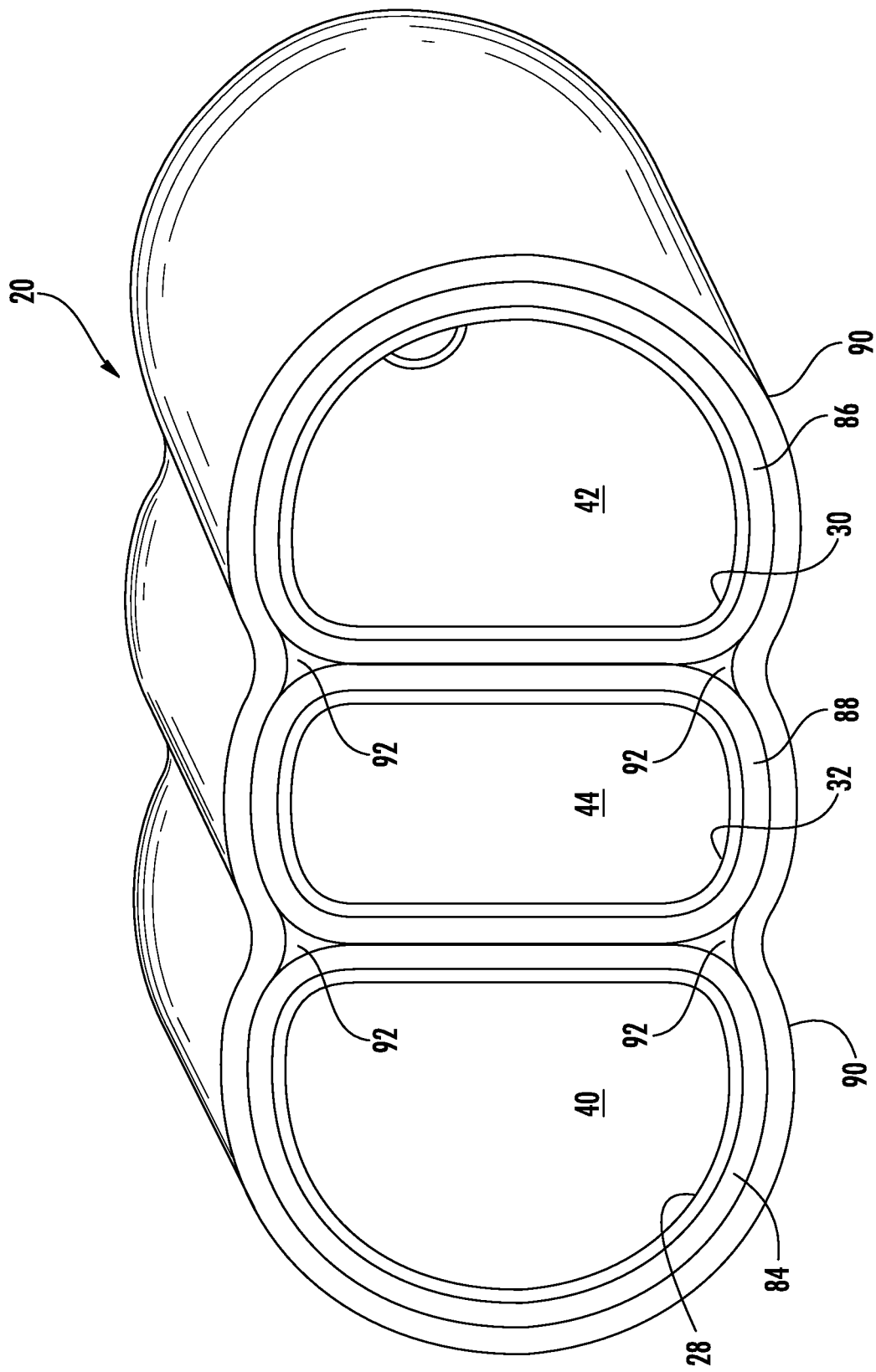
FIG. 5 is a perspective cross section of the vessel assembly.

Referring to FIG. 5, the composite vessel assembly 20 may include an outer layer 90 that generally covers and envelops the inner-layers 84, 86, 88. The outer layer 90 may be applied after the inner-layers 84, 86, 88 are joined. The outer layer 90 may be a composite, and may be a mixture of a non-continuous (e.g., chopped) fiber and resin that may be spray applied (i.e., spray chopped fiber/resin) or may be a sheet molding compound (SMC). The primary reinforcement (i.e., the chopped fibers), may be made of a carbon fiber, a glass fiber or an aramid fiber of about one (1) inch in length (2.5 cm). The resin for binding the chopped fibers may include epoxy, vinyl ester, urethane, and other resin/polymer systems that may be nano-enhanced. It is further contemplated and understood that the outer layer 90 may comprise other materials and/or processes including automated fiber placement, winded filaments, and/or a mixture of continuous and non-continuous fiber.

The composite vessel assembly 20 may further include a plurality of junctions 92 with each junction located where respective ends of the outer walls 60, 72, 78, ends of the sidewalls 68, 70, and ends of interior walls 62 generally meet (also see FIG. 3). Each junction 92 may be generally triangular in cross section, and may generally be located at a center of a Y-shaped seam (i.e., where the inner and outer layers adhere to one another). The junction 92 may be made of the same material as the outer layer 90. When the vessels 22, 24, 26 are under internal pressure, areas proximate to and/or at the junctions 92 are designed to withstand significant through-thickness tensile stress that would otherwise challenge layered composite structures.

In one embodiment where continuous fiber is utilized for the inner-layers 84, 86, 88 and the chopped fiber is used for the outer layer 90, the vessel assembly 20 may be much lighter in weight than if the entire assembly were made with a chopped fiber. However, the internal structural sidewalls 68, 70 and internal walls 62 may have different thicknesses (e.g., about half as thick) than the outer walls 60, 72, 78 with the hybrid of continuous fiber and chopped fiber. For this embodiment of hybrid composite wall construction, the internal structural sidewalls 68, 70 and internal walls 62 may have a higher or lower effective stiffness than the hybrid outer walls 60, 72, 78, and therefore the junctions 92 will require an optimized angle that is different from about one-hundred and twenty (120) degrees that would typically be derived from homogeneous materials. The junction 92 angle and the internal wall thickness can be optimized based on specific material properties and hybrid wall construction.

Figure 6:
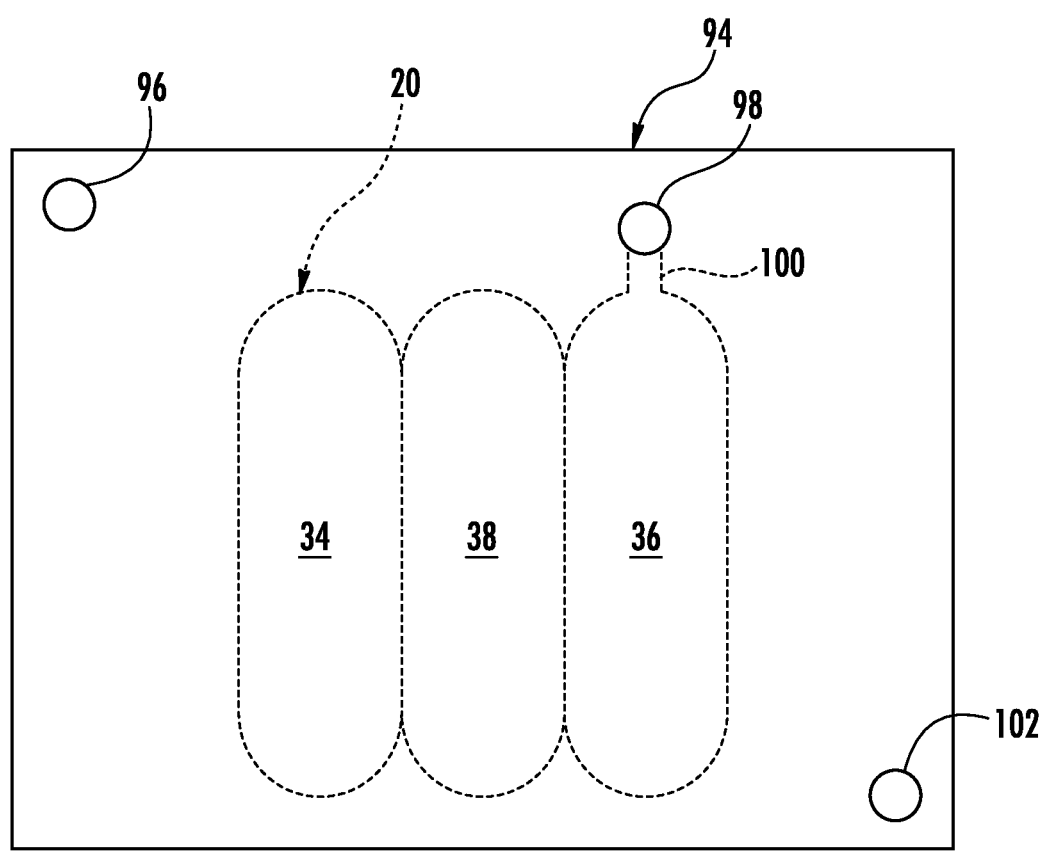
FIG. 6 is a plan view of a pliable containment as a tool to manufacture the vessel assembly.

Referring to FIG. 6, a pliable containment 94 is illustrated as a tool for manufacturing the vessel assembly 20. The pliable containment 94 may be a sealable bag that may be resiliently flexible, may be made of a plastic film, and is large enough to contain the vessel assembly 20. The pliable containment 94 may include an orifice or opening 96 that may be defined by a nozzle of the containment (not shown), and is constructed and arranged to attach a vacuum hose, or vacuum supply, in order to draw a vacuum upon the containment 94. The containment 94 may include another orifice or opening 98 that is strategically placed such that a portion of the containment 94 that defines the orifice 98 may be sealed about a nozzle 100 of the vessel assembly 20 that is in fluid communication with the chambers 34, 36, 38 of the vessel assembly 20. In this way, the chambers 34, 36, 38 may be exposed to atmospheric pressure, or positive pressure, while the composites of the vessel assembly 20 are generally exposed to a vacuum during a manufacturing process. In one embodiment, the containment 94 may include another orifice or opening 102 that may be placed at an opposite end of the containment from the vacuum draw orifice 96. In one example, and in operation, while a vacuum is being drawn through orifice 96, an uncured resin may flow through the orifice 102, into the containment 94, and infusing parts (e.g., layers, junctions, etc.) of the composite vessel 20.

Figure 7:
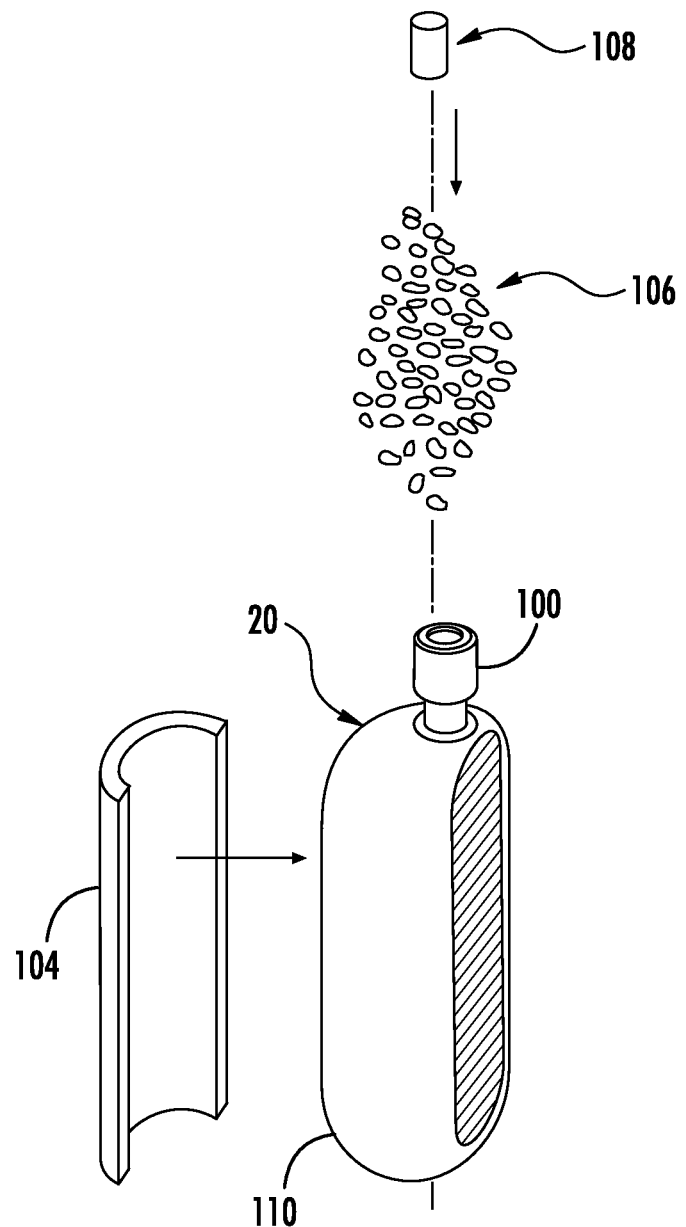
FIG. 7 is a partial perspective view of a plug, granulate, and a sheet as tools used to manufacture the vessel assembly.

Referring to FIG. 7, additional tools for manufacturing the vessel assembly 20 may include at least one sheet 104 that may be at least partially flexible, granulates 106, and a plug 108. The sheet 104 is applied to an exterior surface 110 of the vessel assembly 20 and may be rigid enough to assist in forming the surface before the resin cures to reduce or eliminate machining of the surface after the resin cures, and/or reduce or eliminate the need for a mold to form the exterior surface 110. In one embodiment, a porous release film may be applied to, or may be part of, the sheet 104, such that the porous release film is disposed between the sheet 104 and the composite. The porous film is constructed and arranged to facilitate the release of air from the composite materials of the pressure vessel during application of the vacuum. In another embodiment, the granulate 106 may be sized to easily flow through the nozzle 100, and the plug 108 is sized to releasably plug the nozzle after the granulates 106 are within the chambers 34, 36, 38.

Figure 8:
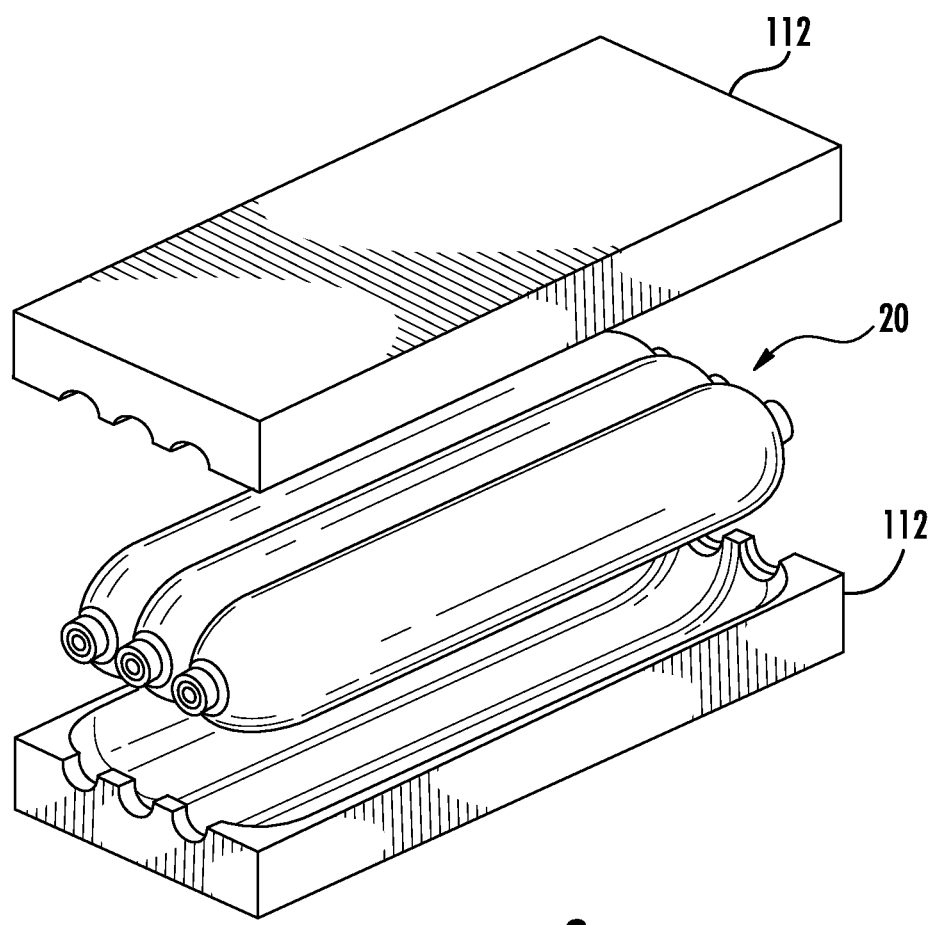
FIG. 8 is a perspective view of a compression mold as a tool to manufacture the vessel assembly.

Referring to FIG. 8, a rigid mold 112 is illustrated as another tool for manufacturing the vessel assembly 20. In one embodiment and after the vessel assembly 20 is exposed to the vacuum, the assembly may be placed in the mold 112. Once in place, the chambers 34, 36, 38 defined by the respective liners 28, 30, 32 may be pressurized and the resins of the inner and outer layers 84, 86, 88, 90 may be allowed to cure under heat.

Figure 9:
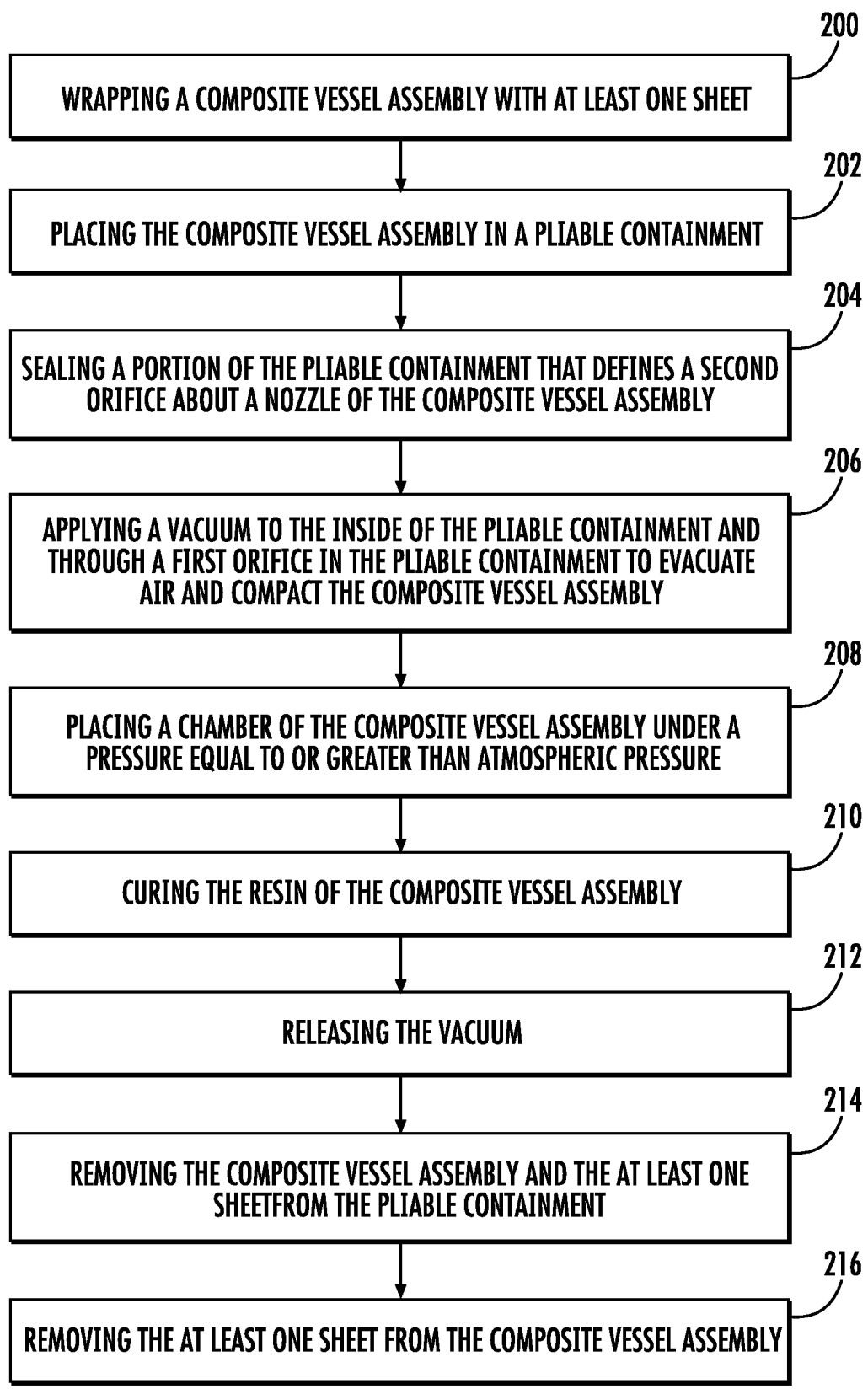
FIG. 9 is a flow chart of a method of manufacturing the vessel assembly utilizing the sheet(s)

Referring to FIG. 9, a non-limiting, embodiment of a process of manufacturing the vessel assembly 20 is illustrated. At block 200, the exterior surface 110 of the vessel assembly 20 may be wrapped with at least one of the sheets 104. At block 202, the composite vessel assembly 20 and the sheets 104 are placed in the pliable containment 94. At block 204, a sealing portion of the pliable containment 94, which defines the orifice 98, is sealed about the nozzle 100 of the pressure vessel 20. This arrangement may provide fluid communication between the chambers 34, 36, 38 of the vessel assembly 20 with atmosphere. In an alternative embodiment, this arrangement may expose the chambers 34, 36, 38 to a positive pressure (e.g., about 25 psi to 100 psi) applied to the chambers while a vacuum (e.g., about 20 to 30 inches of Mercury (Hg)) is applied to the composite that carries the exterior surface 110 of the vessel assembly 20.

At block 206, a vacuum is applied to the inside of the pliable containment 94 via the orifice 96 in the containment. In this way, air is generally evacuated from the pliable containment 94 causing the containment to make biased contact with the sheets 104 and/or external surface 110 of the vessel assembly 20. With a sustained vacuum, the composite walls of the vessel assembly 20 are compacted as the walls release air. At block 208, a positive pressure may be applied to the chambers 34, 36, 38 via the orifice 98 and nozzle 100. This positive pressure may assist the liners 28, 30, 32 in resisting the biasing force produced by the pliable containment contact with the external surface 110. Generally, the outward directed forces produced inside the vessel assembly 20 is substantially balanced with the inward directed forces produced on the outside of the vessel assembly. If the inward directed forces are higher than the outward directed forces, the interior sidewall or liner may need to be rigid enough, or otherwise support by a packed granular, to prevent vessel collapse.

At block 210 and while the vacuum is applied, an uncured resin that may be pre-applied to the walls or layers of the vessel assembly 20 may then cure. At block 212, once the resin is cured, the vacuum is released. At block 214, the composite vessel assembly 20 and the sheets 104 are removed from the pliable containment 94. At block 216, the sheets 104 are removed from the composite vessel assembly providing a relatively smooth and contoured exterior surface 110 that requires minimal, or no, machining.

Figure 10:
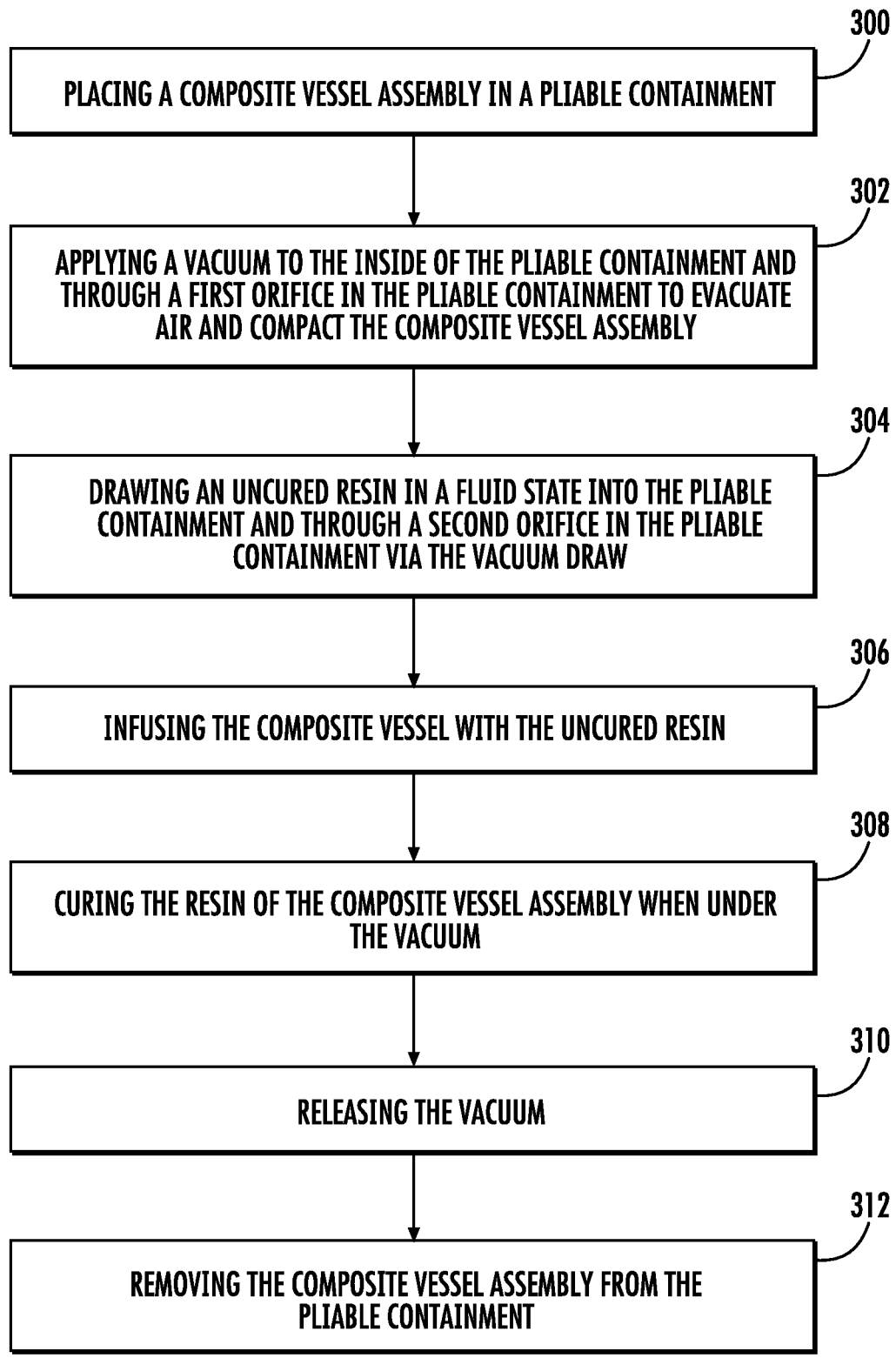
FIG. 10 is a flow chart of another method of manufacturing the vessel assembly utilizing an orifice in a pliable containment to draw a liquid resin into the containment.

Referring to FIG. 10, a second, non-limiting, embodiment of a process of manufacturing the vessel assembly 20 is illustrated. At block 300, the composite vessel assembly 20 is placed in the pliable containment 94. At block 302, a vacuum is applied to the inside of the pliable containment 94 via the orifice 96 in the containment. In this way, air is generally evacuated from the pliable containment 94 causing the containment to make biased contact with the sheets 104 and/or external surface 110 of the vessel assembly 20. At block 304, an uncured resin, in liquid form, flows through the orifice 102 (i.e., is drawn via the vacuum) and into the pliable containment 94. At block 306, uncured resin generally flows toward the orifice 96, and thereby impregnates the various fiber layers of the vessel assembly 20. With a sustained vacuum, the composite walls of the vessel assembly 20 are compacted as the walls release air.

At block 308, the resin may be cured while under vacuum. At block 310, the vacuum is released. At block 312, the composite vessel assembly 20 is removed from the pliable containment.

Figure 11:
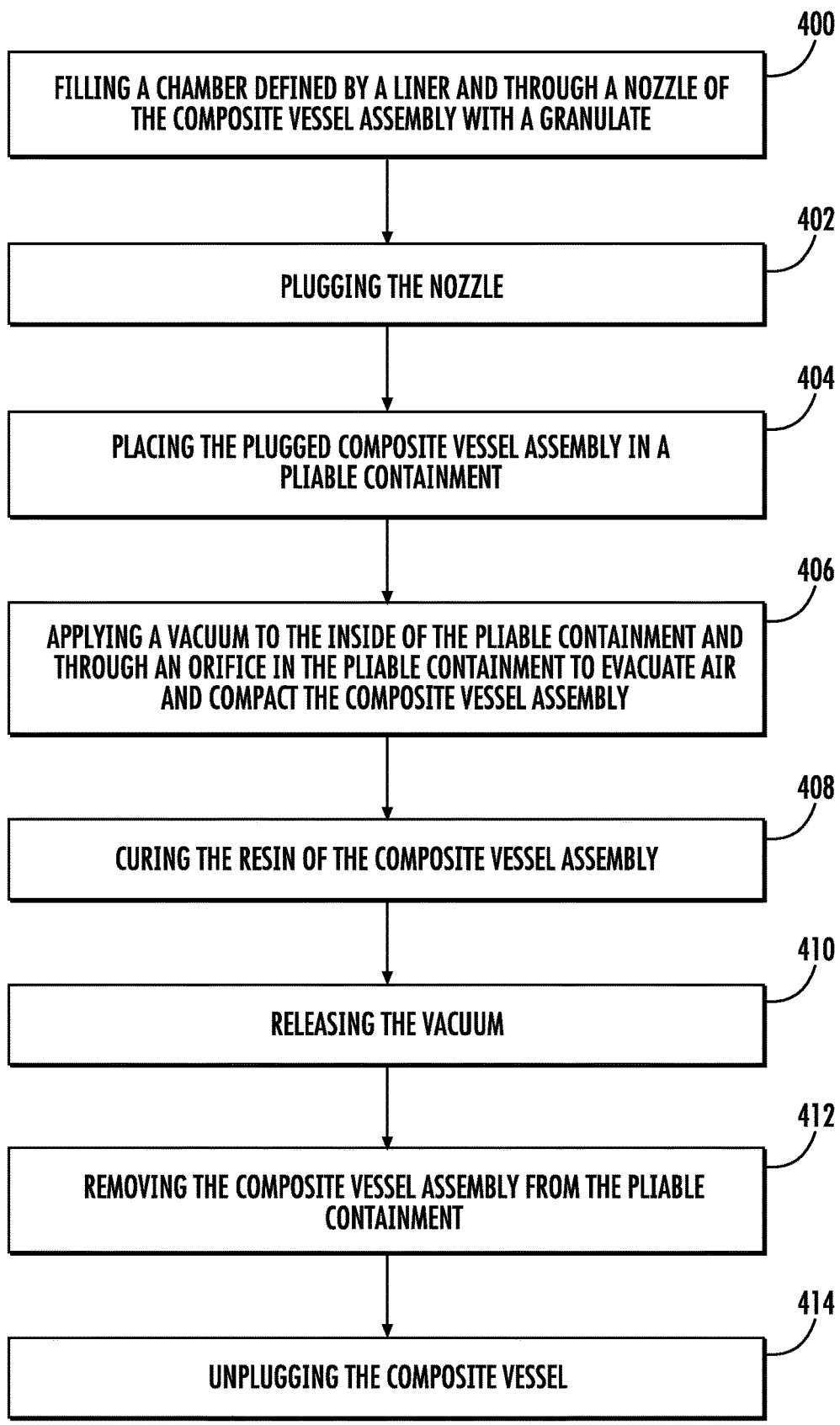
FIG. 11 is a flow chart of another method of manufacturing the vessel assembly utilizing the plug and granulate.

Referring to FIG. 11, a third, non-limiting embodiment of a process of manufacturing the vessel assembly 20 is illustrated. At block 400, the chambers 34, 36, 38 of the vessel assembly 20 may be filled with the granulate 106. At block 402, the plug 108 may be releasably sealed to the nozzle 100, thereby containing the granulate 106 and atmospheric pressure within the chambers. At block 404, the plugged composite vessel assembly is placed in the pliable containment 94. At block 406, a vacuum is applied to the inside of the pliable containment 94 via the orifice 96 in the containment. In this way, air is generally evacuated from the pliable containment 94 causing the containment to make biased contact with the sheets 104 and/or external surface 110 of the vessel assembly 20. The granulate 106 and/or the atmospheric pressure contained therein, may assist the liners 28, 30, 32 in resisting the inward forces produced by the biasing contact of the pliable containment 94. With a sustained vacuum, the composite walls of the vessel assembly 20 are compacted as the walls release air. It is contemplated and understood that the interior walls or liner(s) may be completely sealed to prevent leakage of air into the outer composites.

At block 408, the resin may be cured while under vacuum. At block 410, the vacuum is released. At block 412, the composite vessel assembly 20 is removed from the pliable containment. At block 414, the composite vessel 20 may be unplugged and the granulate 106 may be removed. In one embodiment, the granulate 106 may be part of the vessel assembly 20. For example, the granulate 106 may be constructed and arranged to absorb gases.

Figure 12:
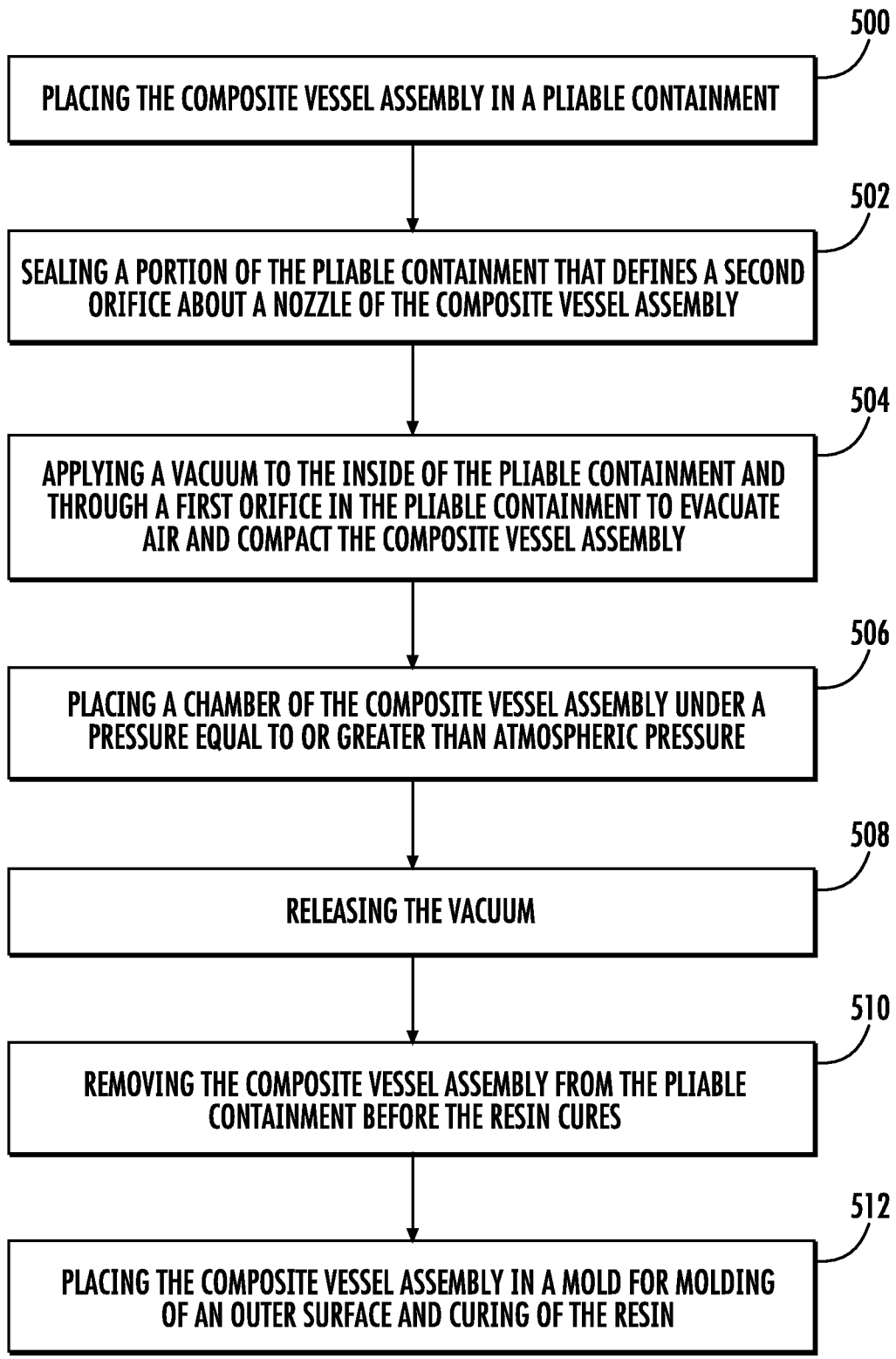
FIG. 12 is a flow chart of another method of manufacturing the vessel assembly utilizing the compression mold.

Referring to FIG. 12, a fourth, non-limiting, embodiment of a process of manufacturing the vessel assembly 20 is illustrated. At block 500, the composite vessel assembly 20 is placed in the pliable containment 94. At block 502, a sealing portion of the pliable containment 94, which defines the orifice 98, is sealed about the nozzle 100 of the pressure vessel 20. This arrangement may provide fluid communication between the chambers 34, 36, 38 of the vessel assembly 20 with atmosphere. In an alternative embodiment, this arrangement may expose the chambers 34, 36, 38 to a positive pressure applied to the chambers while a vacuum is applied to the exterior surface 110 (i.e., composite(s)) of the vessel assembly 20.

At block 504, a vacuum is applied to the inside of the pliable containment 94 via the orifice 96 in the containment. In this way, air is generally evacuated from the pliable containment 94 causing the containment to make biased contact with the sheets 104 and/or external surface 110 of the vessel assembly 20. With a sustained vacuum, the composite walls of the vessel assembly 20 are compacted as the walls release air. At block 506, a positive pressure may be applied to the chambers 34, 36, 38 via the orifice 98 and nozzle 100. This positive pressure may assist the liners 28, 30, 32 in resisting the inward force produced by the biasing contact of the pliable containment with the external surface 110.

At block 508 and before the resin is cured, the vacuum may be released. At block 510, the vessel assembly 20 may be removed from the pliable containment 94. At block 512, the vessel assembly 20 may be placed in the mold 112 to mold or form the external surface 110 and cure the resin. It is understood and contemplate that various steps of the four methods of manufacturing the vessel assembly as described herein may be added or interchanged with other method steps, and/or provide in different orders.

Advantages and benefits of the present disclosure include a lightweight storage tank with a high energy storage density. The method(s) may significantly reduce the composite manufacturing tooling otherwise needed. Moreover, a uniform pressure and temperature in the entire vessel composite during cure may assist to maintain the geometric shape of the assembly. Yet further, vacuuming reduces residue air I the composite materials prior to curing, thereby reducing porosity in the cured composites, resulting in substantially stronger mechanical properties.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of manufacturing a composite vessel assembly comprising:
   placing the composite vessel assembly in a pliable containment prior to curing of a resin of the composite vessel assembly; and
   applying a vacuum to the inside of the pliable containment and through a first orifice in a pliable portion of the pliable containment to evacuate air and compact the composite vessel assembly.

2. The method set forth in claim 1, wherein the pliable containment is in biased contact with the composite vessel assembly when the vacuum is applied, and the pliable containment is completely pliable.

3. The method set forth in claim 1, further comprising:
   sealing a portion of the pliable containment that defines a second orifice about a nozzle of the composite vessel assembly; and
   placing a chamber of the composite vessel assembly under a pressure equal to or greater than atmospheric pressure when the pliable containment is under the vacuum.

4. The method set forth in claim 3, wherein a liner of the composite vessel assembly defines the chamber and a composite layer of the composite vessel assembly at least in-part surrounds the liner.

5. The method set forth in claim 1 further comprising:
   curing the resin of the composite vessel assembly when under the vacuum.

6. The method set forth in claim 5, further comprising:
   wrapping the composite vessel assembly with at least one sheet before placing the composite vessel assembly in the pliable containment;
   releasing the vacuum after the resin has cured;
   removing the composite vessel assembly and the at least one sheet from the pliable containment; and
   removing the at least one sheet from the composite vessel assembly.

7. The method set forth in claim 1, further comprising:
   drawing the uncured resin when in a fluid state into the pliable containment and through a third orifice in the pliable containment when under the vacuum; and
   infusing the composite vessel assembly with the uncured resin.

8. The method set forth in claim 1, wherein the pliable containment is a bag.

9. The method set forth in claim 1, further comprising:
   wrapping the composite vessel assembly with at least one sheet before placing the composite vessel assembly in the pliable containment;
   releasing the vacuum;
   removing the composite vessel assembly and the at least one sheet from the pliable containment; and
   removing the at least one sheet from the composite vessel assembly.

10. The method set forth in claim 9, wherein the at least one sheet includes a porous release film.

11. The method set forth in claim 1, further comprising:
    filling a chamber defined by a liner of the composite vessel assembly with a granulate.

12. The method set forth in claim 11, further comprising:
    plugging a nozzle of the composite vessel assembly after filling the chamber with the granulate and before applying the vacuum.

13. The method set forth in claim 11, wherein the liner is at least in part surrounded by a composite layer exposed to the vacuum and in contact with the pliable containment when under the vacuum, and the pliable containment is completely pliable.

14. The method set forth in claim 1, wherein the composite vessel assembly includes an outer composite layer, a plurality of vessels, and a plurality of junctions generally disposed between each adjacent vessel of the plurality of vessels, and wherein the outer composite layer surrounds the plurality of vessels and the plurality of junctions.

15. The method set forth in claim 14, wherein the outer composite layer and the plurality of junctions are resin-based and uncured when the vacuum is applied.

16. The method set forth in claim 1, further comprising:
    releasing the vacuum prior to curing of the resin;
    removing the composite vessel assembly from the pliable containment; and placing the composite vessel assembly in a mold for curing of the resin.

* * * * *